（12）United States Patent
Payson

(10) Patent No.: US 7,480,335 B2
(45) Date of Patent: Jan. 20, 2009

(54) VIDEO DECODER FOR DECODING MACROBLOCK ADAPTIVE FIELD/FRAME CODED VIDEO DATA WITH SPATIAL PREDICTION

(75) Inventor: Christopher Payson, Bolton, MA (US)

(73) Assignee: Broadcom Corporation, Irvine, CA (US)

( * ) Notice: Subject to any disclaimer, the term of this patent is extended or adjusted under 35 U.S.C. 154(b) by 247 days.

(21) Appl. No.: 10/892,899

(22) Filed: Jul. 16, 2004

(65) Prior Publication Data

US 2005/0259743 A1 Nov. 24, 2005

Related U.S. Application Data

(60) Provisional application No. 60/573,149, filed on May 21, 2004.

(51) Int. Cl.
*H04N 7/18* (2006.01)
(52) U.S. Cl. .............................. 375/240.25; 375/240.12; 375/240.15
(58) Field of Classification Search ................. 375/240.01–240.29
See application file for complete search history.

(56) References Cited

U.S. PATENT DOCUMENTS

| | | | | |
|---|---|---|---|---|
| 5,557,332 A | * | 9/1996 | Koyanagi et al. | 375/240.16 |
| 6,005,624 A | * | 12/1999 | Vainsencher | 375/240.14 |
| 6,259,732 B1 | * | 7/2001 | Lee | 375/240 |

\* cited by examiner

*Primary Examiner*—Andy S Rao
(74) *Attorney, Agent, or Firm*—McAndrews Held & Malloy Ltd.

(57) ABSTRACT

Described herein is a video decoder for decoding macroblock adaptive field/frame coded video data with spatial prediction. In one embodiment, there is presented a spatial predictor for processing a macroblock pair. The spatial predictor comprises a first buffer, a second buffer, a third buffer, and arithmetic logic. The first buffer stores pixels from a first portion of the picture, the first portion neighboring the portion. The second buffer stores pixels from a second portion of the picture, the second portion neighboring the portion. The third buffer stores one or more pixels from a third portion of the picture, the third portion neighboring the portion. The arithmetic logic processes the portion from at least one of the pixels from the first buffer, at least one of the pixels from the second buffer, and at least one of the pixels from the third buffer.

18 Claims, 11 Drawing Sheets

$$W_0 \; \boxed{\underline{130}} \; \boxed{P_0} \; - \; W_1 \; \boxed{P_1} \; = \; \boxed{E}$$

Top Field 110T    Bottom Field 110B

VIDEO DECODER FOR DECODING MACROBLOCK ADAPTIVE FIELD/FRAME CODED VIDEO DATA WITH SPATIAL PREDICTION

RELATED APPLICATIONS

This application claim priority to "Video Decoder for Decoding Macroblock Adaptive Field/Frame Coded Video Data with Spatial Prediction", Provisional Application for U.S. Patent Ser. No. 60/573,149 filed May 21, 2004 by Payson, which is incorporated herein by reference for all purposes.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Encoding standards often use recursion to compress data. In recursion, data is encoded as a mathematical function of other previous data. As a result, when decoding the data, the previous data is needed.

An encoded picture is often assembled in portions. Each portion is associated with a particular region of the picture. The portions are often decoded in a particular order. For decoding some of the portions, data from previously decoded portions is needed.

A video decoder typically includes integrated circuits for performing computationally intense operations, and memory. The memory includes both on-chip memory and off-chip memory. On-chip memory is memory that is located on the integrated circuit and can be quickly accessed. Off-chip memory is usually significantly slower to access than on-chip memory.

During decoding, storing information from portions that will be used for decoding later portions in on-chip memory is significantly faster than storing the information off-chip. However, on-chip memory is expensive, and consumes physical area of the integrated circuit. Therefore, the amount of data that on-chip memory can store is limited. In contrast, decoded video data generates very large amounts of data. Therefore, it may be impractical to store all of the decoded data on-chip.

The data needed for decoding a portion is typically contained in the neighboring portions that are decoded prior to the portion, such as the left neighbor. For example, in the H.264 standard, pixels in one portion of a picture can be predicted from pixels in another portion of the picture. The edge pixels of a portion are predicted from their top, left, and top left neighboring pixels, which are from another portion.

Additionally, the top, left, and top left pixels may not be determinable until the decoding of the portion. For example, in H.264, macroblock pairs of interlaced frames may be encoded using macroblock adaptive field/frame coding. Where macroblock adaptive field/frame coding is used, the information needed from each neighboring portion depends on whether the portion and the neighboring portion are field or frame coded.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Described herein is a video decoder for decoding macroblock adaptive field/frame coded video data with spatial prediction.

In one embodiment, there is presented a spatial predictor for decoding a portion of a picture. The spatial predictor comprises a first buffer, a second buffer, a third buffer, and arithmetic logic. The first buffer stores pixels from a first portion of the picture, where the first portion neighbors the portion. The second buffer stores pixels from a second portion of the picture, where the second portion neighbors the portion. The third buffer stores one or more pixels from a third portion of the picture, where the third portion neighbors the portion. The arithmetic logic processes the portion from at least one of the pixels from at least one of the first buffer, the second buffer, and the third buffer.

In another embodiment, there is presented a method for processing a portion of a picture. The method comprises storing pixels from a first portion of the picture, where the first portion neighbors the portion in a first memory; storing pixels from a second portion of the picture, where the second portion neighbors the portion in a second memory; storing one or more pixels from a third portion of the picture, where the third portion neighbors the portion in a third memory; and processing the portion from at least one of the pixels from at least one of the first memory, the second memory, and the third memory, at arithmetic logic proximate to the first memory, second memory, and a third memory.

These and other features and advantages of the present invention may be appreciated from a review of the following detailed description of the present invention, along with the accompanying figures in which like reference numerals refer to like parts throughout.

DETAILED DESCRIPTION OF THE INVENTION

In certain aspects of the present invention, pixels from portions that are needed to decode portions in a picture are stored in an on-chip memory. The portions can be macroblock adaptive field/frame coded. The foregoing improves the throughput rate by reducing the number of DRAM accesses, as well as allowing DRAM accesses to occur concurrently with other processing functions.

An exemplary video encoding standard, the ITU-H.264 Standard (H.264) (also known as MPEG-4, Part 10, and Advanced Video Coding), will now be described to illustrate exemplary interdependencies between pixels in different portions of a picture.

H.264 Standard

Figure 1:
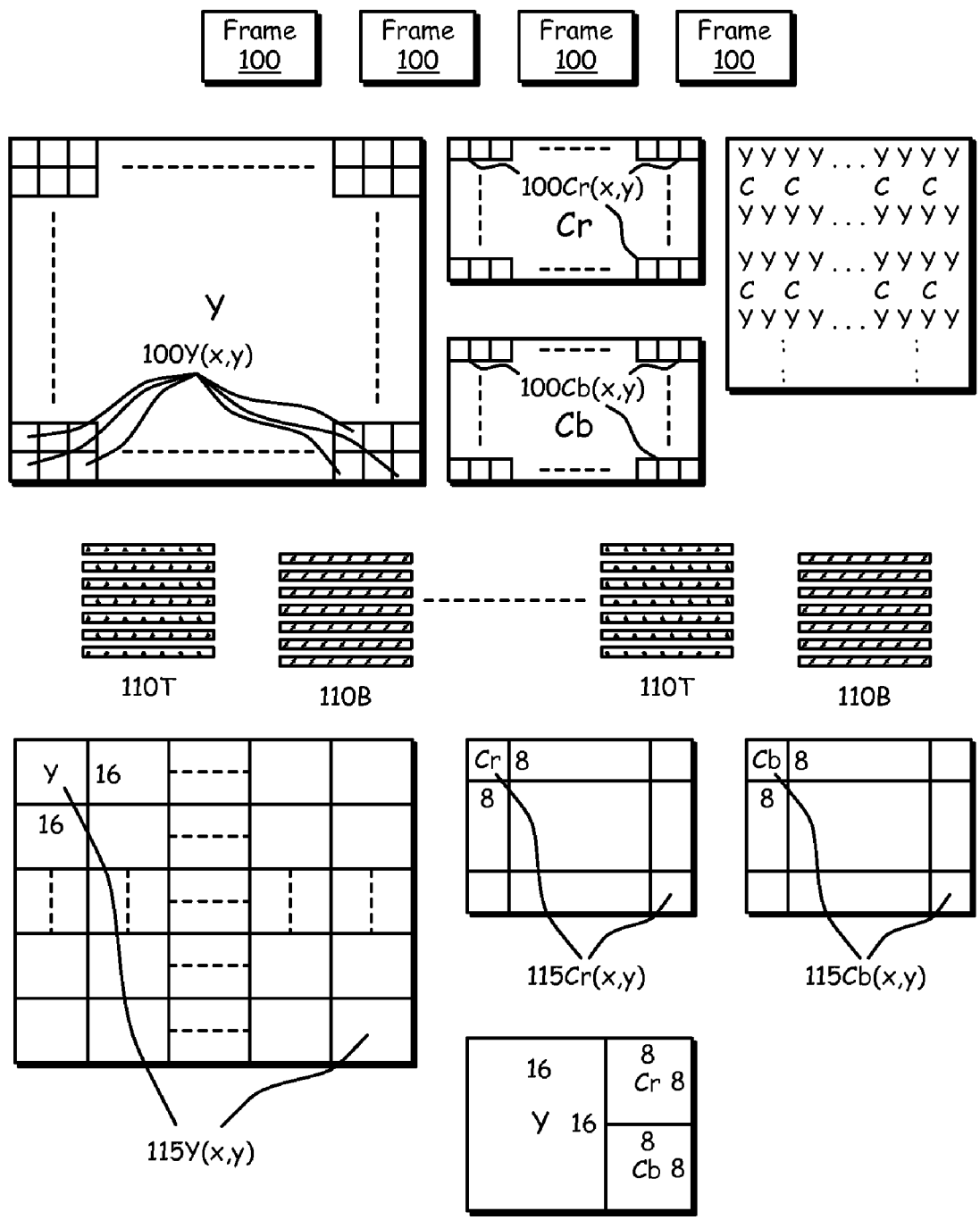
FIG. 1 is a block diagram of an exemplary frame.

Referring now to FIG. 1, there is illustrated a block diagram of a frame 100. A video camera captures frames 100 from a field of view during time periods known as frame durations. The successive frames 100 form a video sequence. A frame 100 comprises two-dimensional grid(s) of pixels 100(x,y).

For color video, each color component is associated with a two-dimensional grid of pixels. For example, a video can include a luma, chroma red, and chroma blue components. Accordingly, the luma, chroma red, and chroma blue components are associated with a two-dimensional grid of pixels $100Y(x,y)$, $100Cr(x,y)$, and $100Cb(x,y)$, respectively. When the grids of two dimensional pixels $100Y(x,y)$, $100Cr(x,y)$, and $100Cb(x,y)$ from the frame are overlayed on a display device 110, the result is a picture of the field of view at the frame duration that the frame was captured.

Generally, the human eye is more perceptive to the luma characteristics of video, compared to the chroma red and chroma blue characteristics. Accordingly, there are more pixels in the grid of luma pixels $100Y(x,y)$ compared to the grids of chroma red $100Cr(x,y)$ and chroma blue $100Cb(x,y)$. In the MPEG 4:2:0 standard, the grids of chroma red $100Cr(x,y)$ and chroma blue pixels $100Cb(x,y)$ have half as many pixels as the grid of luma pixels $100Y(x,y)$ in each direction.

The chroma red $100Cr(x,y)$ and chroma blue $100Cb(x,y)$ pixels are overlayed the luma pixels in each even-numbered column $100Y(x, 2y)$ between each even, one-half a pixel below each even-numbered line $100Y(2x, y)$. In other words, the chroma red and chroma blue pixels $100Cr(x,y)$ and $100Cb(x,y)$ are overlayed pixels $100Y(2x+\frac{1}{2}, 2y)$.

If the video camera is interlaced, the video camera captures the even-numbered lines $100Y(2x,y)$, $100Cr(2x,y)$, and $100Cb(2x,y)$ during half of the frame duration (a field duration), and the odd-numbered lines $100Y(2x+1,y)$, $100Cr(2x+1,y)$, and $100Cb(2x+1,y)$ during the other half of the frame duration. The even numbered lines $100Y(2x,y)$, $100Cr(2x,y)$, and $100Cb(2x,y)$ form what is known as a top field 110T, while odd-numbered lines $100Y(2x+1,y)$, $100Cr(2x+1,y)$, and $100Cb(2x+1,y)$ form what is known as the bottom field 110B. The top field 110T and bottom field 110T are also two dimensional grid(s) of luma $110YT(x,y)$, chroma red $110CrT(x,y)$, and chroma blue $110CbT(x,y)$ pixels.

A luma pixel of the frame $100Y(x,y)$, or top/bottom fields $110YT/B(x,y)$ can be divided into 16×16 pixel $100Y$ (16x->16x+15, 16y->16y+15) blocks $115Y(x,y)$. For each block of luma pixels $115Y(x,y)$, there is a corresponding 8×8 block of chroma red pixels $115Cr(x,y)$ and chroma blue pixels $115Cb(x,y)$ comprising the chroma red and chroma blue pixels that are to be overlayed the block of luma pixels $115Y(x,y)$. A block of luma pixels $115Y(x,y)$, and the corresponding blocks of chroma red pixels $115Cr(x,y)$ and chroma blue pixels $115Cb(x,y)$ are collectively known as a macroblock 120. The macroblocks 120 can be grouped into groups known as slice groups 122.

The H.264 standard encodes video on a frame by frame basis, and encodes frames on a macroblock by macroblock basis. H.264 specifies the use of spatial prediction, temporal prediction, transformation, interlaced coding, and lossless entropy coding to compress the macroblocks 120.

Figure 2A:
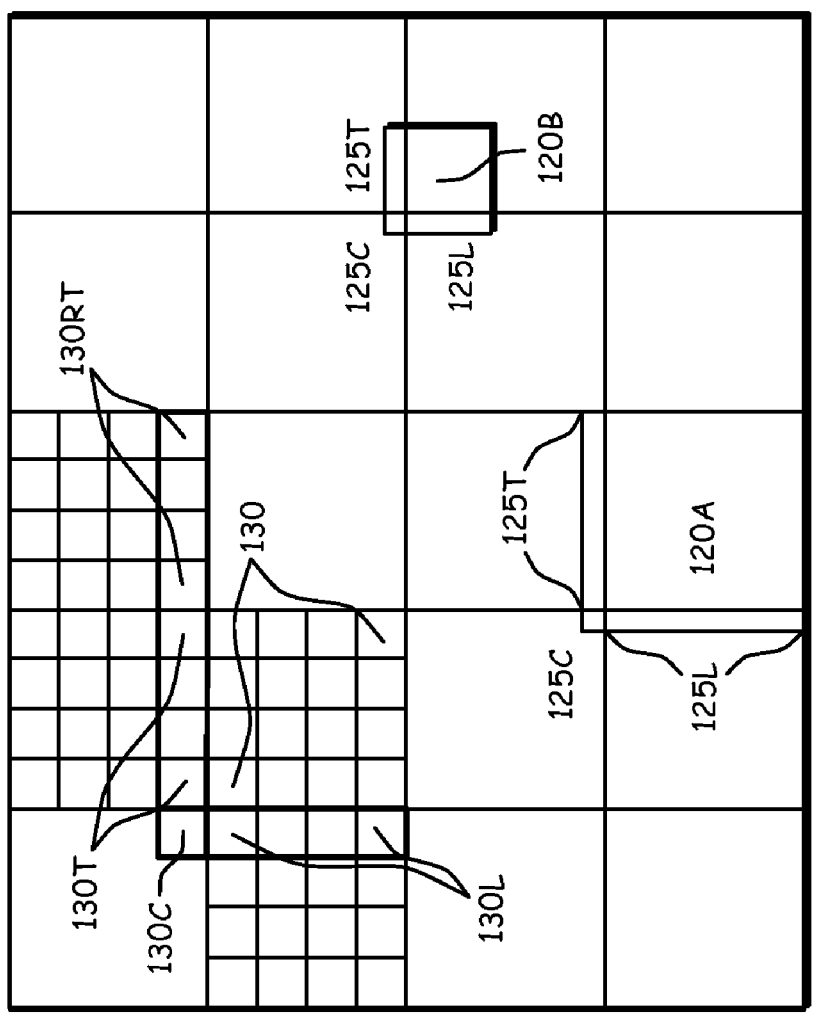
FIG. 2A is a block diagram describing spatially predicted macroblocks.

Unless otherwise specified, it is assumed that the pixel dimensions for a unit, such as a macroblock or partition, shall generally refer to the dimensions of the luma pixels of the unit. Also, and unless otherwise specified, it is assumed that a unit with a given pixel dimension shall also generally include the corresponding chroma red and chroma blue pixels that overlay the luma pixels. However, these assumptions shall not operate to limit the scope of the present invention. The dimensions of the chroma red and chroma blue pixels for the unit depend on whether 4:2:0, 4:2:2 or another format is used, and may differ from the dimensions of the luma pixels Spatial Prediction Referring now to FIG. 2A, there is illustrated a block diagram describing spatially encoded macroblocks 120. Spatial prediction, also referred to as intraprediction, involves prediction of frame pixels from neighboring pixels. The pixels of a macroblock 120 can be predicted, either in a 16×16 mode, an 8×8 mode, or a 4×4 mode.

In the 16×16 and 8×8 modes, e.g, macroblock 120a, and 120b, respectively, the pixels of the macroblock are predicted from a combination of left edge pixels 125L, a corner pixel 125C, and top edge pixels 125T. The difference between the macroblock 120a and prediction pixels P is known as the prediction error E. The prediction error E is calculated and encoded along with an identification of the prediction pixels P and prediction mode, as will be described.

In the 4×4 mode, the macroblock 120c is divided into 4×4 partitions 130. The 4×4 partitions 130 of the macroblock 120a are predicted from a combination of left edge partitions 130L, a corner partition 130C, right edge partitions 130R, and top right partitions 130TR. The difference between the macroblock 120a and prediction pixels P is known as the prediction error E. The prediction error E is calculated and encoded along with an identification of the prediction pixels and prediction mode, as will be described. A macroblock 120 is encoded as the combination of the prediction errors E representing its partitions 130.

Temporal Prediction

Figure 2B:
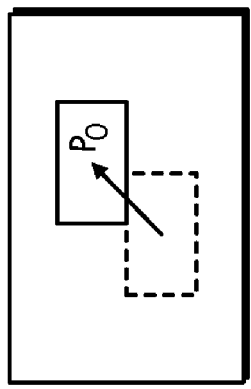
FIG. 2B is a block diagram describing temporally predicted macroblocks.
Figure 2B:
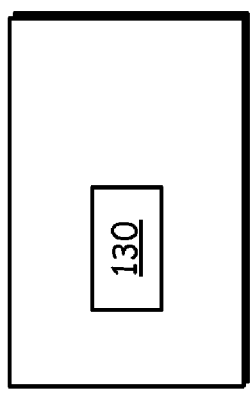
Figure 2B:
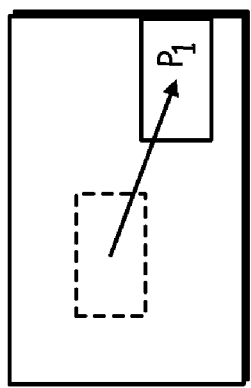
Figure 2B:
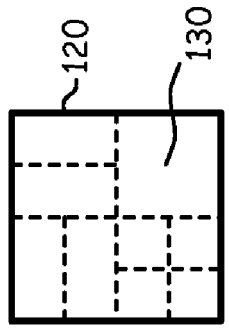

Referring now to FIG. 2B, there is illustrated a block diagram describing temporally encoded macroblocks 120. The temporally encoded macroblocks 120 can be divided into 16×8, 8×16, 8×8, 4×8, 8×4, and 4×4 partitions 130. Each partition 130 of a macroblock 120, is compared to the pixels of other frames or fields for a similar block of pixels P. A macroblock 120 is encoded as the combination of the prediction errors E representing its partitions 130.

The similar block of pixels is known as the prediction pixels P. The difference between the partition 130 and the prediction pixels P is known as the prediction error E. The prediction error E is calculated and encoded, along with an identification of the prediction pixels P. The prediction pixels P are identified by motion vectors MV. Motion vectors MV describe the spatial displacement between the partition 130 and the prediction pixels P. The motion vectors MV can, themselves, be predicted from neighboring partitions.

The partition can also be predicted from blocks of pixels P in more than one field/frame. In bi-directional coding, the partition 130 can be predicted from two weighted blocks of pixels, P0 and P1. Accordingly, a prediction error E is calculated as the difference between the weighted average of the prediction blocks w0P0+w1P1 and the partition 130. The prediction error E, an identification of the prediction blocks P0, P1 are encoded. The prediction blocks P0 and P1 are identified by motion vectors MV.

The weights w0, w1 can also be encoded explicitly, or implied from an identification of the field/frame containing the prediction blocks P0 and P1. The weights w0, w1 can be implied from the distance between the frames/fields containing the prediction blocks P0 and P1 and the frame/field containing the partition 130. Where T0 is the number of frame/field durations between the frame/field containing P0 and the frame/field containing the partition, and T1 is the number of frame/field durations for P1, $$w0=1-T0/(T0+T1)$$

$$w1=1-T1/(T0+T1)$$

For a high definition television picture, there are thousands of macroblocks 120 per frame 100. The macroblocks 120, themselves can be partitioned into potentially 16 4×4 partitions 130, each associated with potentially different motion vector sets. Thus, coding each of the motion vectors without data compression can require a large amount of data and bandwidth.

Transformation, Quantization, and Scanning

Figure 2C:
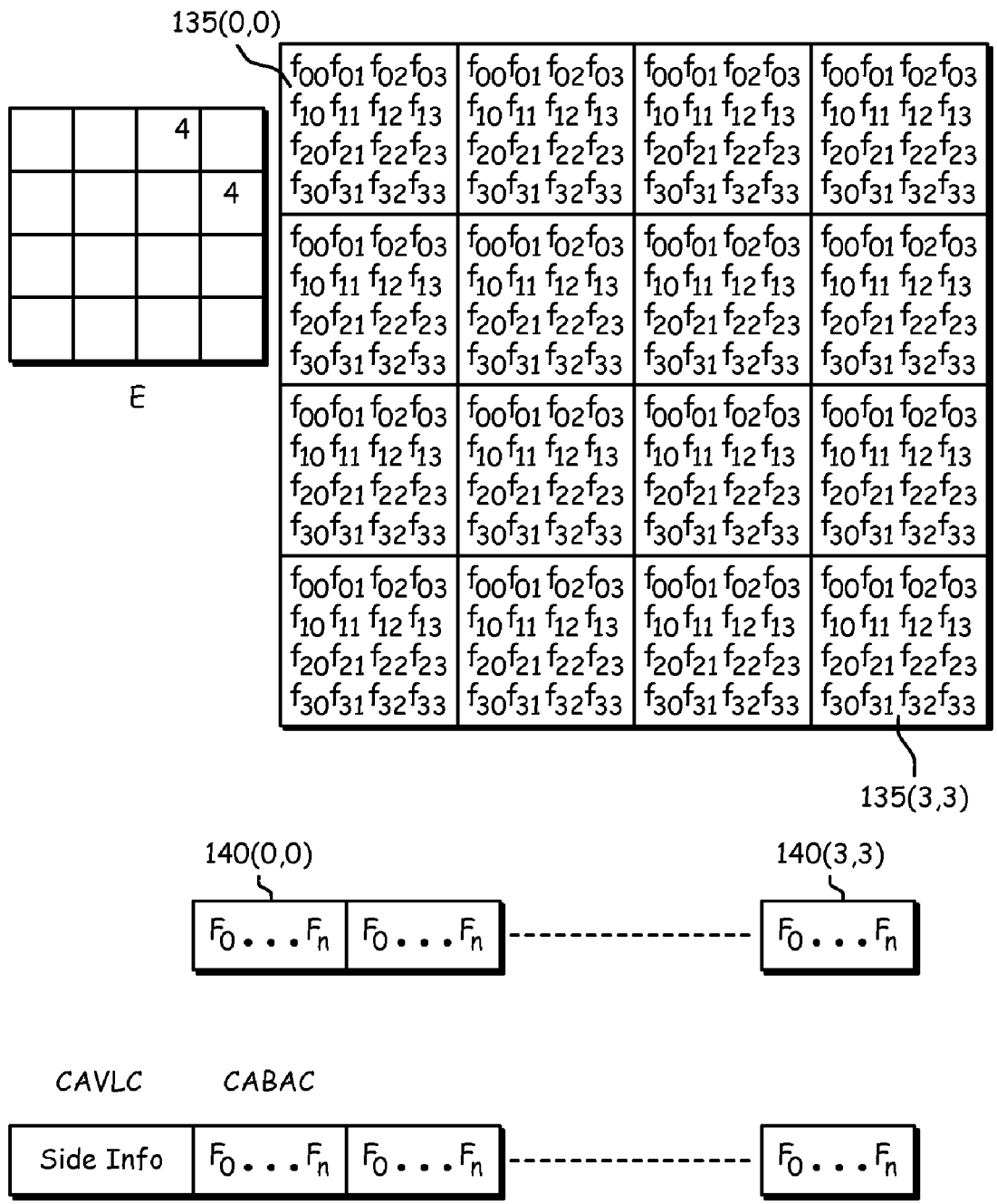
FIG. 2C is a block diagram describing the encoding of a prediction error.

Referring now to FIG. 2C, there is illustrated a block diagram describing the encoding of the prediction error E. With both spatial prediction and temporal prediction, the macroblock 120 is represented by a prediction error E. The prediction error E is also two-dimensional grid of pixel values for the luma Y, chroma red Cr, and chroma blue Cb components with the same dimensions as the macroblock 120.

A transformation transforms 4×4 partitions 130(0,0) . . . 130(3,3) of the prediction error E to the frequency domain, thereby resulting in corresponding sets 135(0,0) . . . 135(3,3) of frequency coefficients $f_{00}$ . . . $f_{33}$. The sets of frequency coefficients are then quantized and scanned, resulting in sets 140(0,0) . . . 140(3,3) of quantized frequency coefficients, $F_0$ . . . $F_n$. A macroblock 120 is encoded as the combination of its partitions 130.

Macroblock Adaptive Frame/Field (MBAFF) Coding

Figure 3:
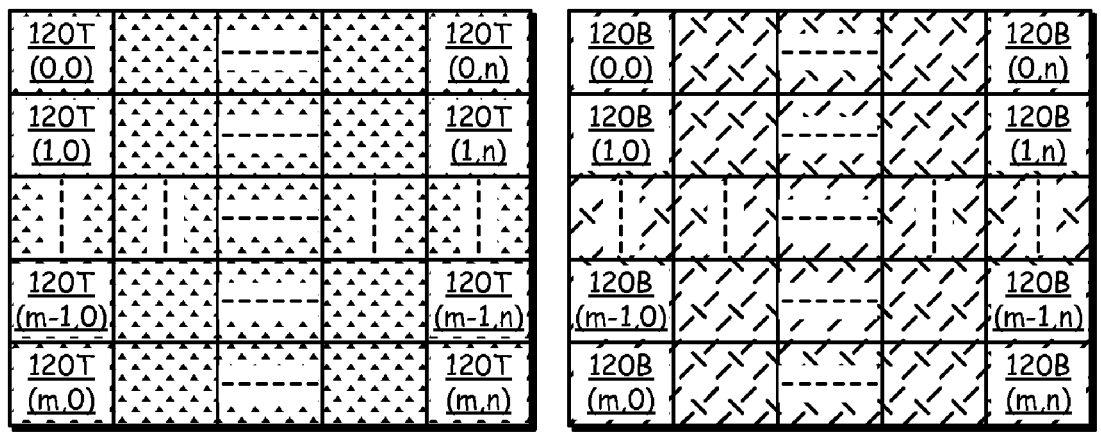
FIG. 3 is a block diagram describing the encoding of macroblocks for interlaced fields in accordance with macroblock adaptive frame/field coding.
Figure 3:
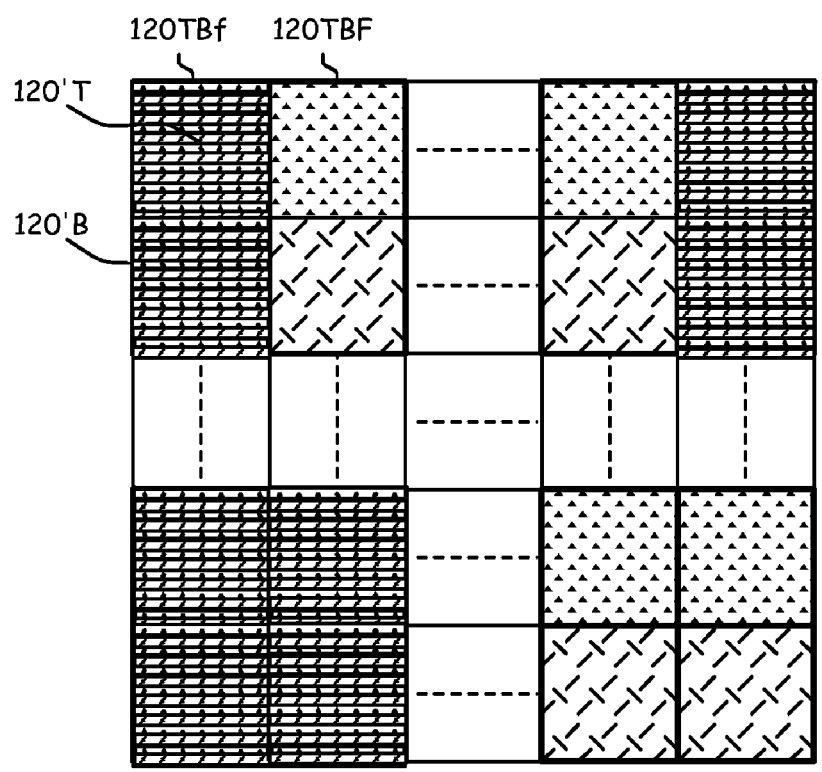

Referring now to FIG. 3, there is illustrated a block diagram describing the encoding of macroblocks 120 for interlaced fields. As noted above, interlaced fields, top field 110T(x,y) and bottom field 110B(x,y) represent either even or odd-numbered lines.

In MBAFF, each macroblock 120T in the top frame is paired with the macroblock 120B in the bottom frame, that is interlaced with it. The macroblocks 120T and 120B are then coded as a macroblock pair 120TB. The macroblock pair 120TB can either be field coded, i.e., macroblock pair 120TBF, or frame coded, i.e., macroblock pair 120TBf. Where the macroblock pair 120TBF are field coded, the macroblock 120T is encoded, followed by macroblock 120B. Where the macroblock pair 120TBf are frame coded, the macroblocks 120T and 120B are deinterlaced. The foregoing results in two new macroblocks 120'T, 120'B. The macroblock 120'T is encoded, followed by macroblock 120'B.

Entropy Coding

Referring again to FIG. 2C, the macroblocks 120 are represented by a prediction error E that is encoded as sets 140(0,0) . . . 140(3,3) of quantized frequency coefficients $F_0$ . . . $F_n$. The macroblock 120 is represented by side information, such as prediction mode indicators, and identification of prediction blocks.

Context Adaptive Variable Length Coding (CAVLC) is used to encode the frequency coefficients $F_0$ . . . $F_n$. In H.264 the CAVLC used to encode the quantized frequency coefficients $F_0$ . . . $F_n$ for a 4×4 partition 130(x,y) depends on the quantized frequency coefficients $F_0$ . . . $F_n$ of its top neighboring partition 130(x−1,y) and left neighboring partition 130(x, y−1).

Content Adaptive Binary Arithmetic Coding (CABAC) is used to encode the side information. In CABAC coding, the information is first transformed to what is known as CABAC Binary Symbols (bins). The bins are then transformed to CABAC symbols.

The frames 100 are encoded as the macroblocks 120 forming them. The video sequence is encoded as the frame forming it. The encoded video sequence is known as a video elementary stream. The video elementary stream is a bitstream that can be transmitted over a communication network to a decoder. Transmission of the bitstream instead of the video sequence consumes substantially less bandwidth.

As can be seen from the foregoing discussion, the pixels needed for decoding a portion, such as a macroblock pair, includes pixels in the left, top left, and top neighboring portions. During decoding, storing pixels from macroblock pairs that will be used for decoding later macroblock pairs in on-chip memory is significantly faster than storing the information off-chip. However, on-chip memory is expensive, and consumes physical area of the integrated circuit. Therefore, the amount of data that on-chip memory can store is limited. In contrast, decoded video data generates very large amounts of data.

Additionally, where macroblock adaptive field/frame coding is used, the pixels needed from each of the neighboring macroblock pairs depends on whether the macroblock pair and the neighboring macroblock pairs are field or frame coded.

A video decoder, wherein left, top, and top left corner neighboring pixels from macroblock pairs that are need to decode a macroblock pair are stored in an on-chip memory, will now be presented. The macroblock pairs can be macroblock adaptive field/frame coded. The foregoing improves the throughput rate by reducing the number of DRAM accesses, as well as allows DRAM accesses to occur concurrently with other processing functions.

Exemplary Video Decoder

Figure 4:
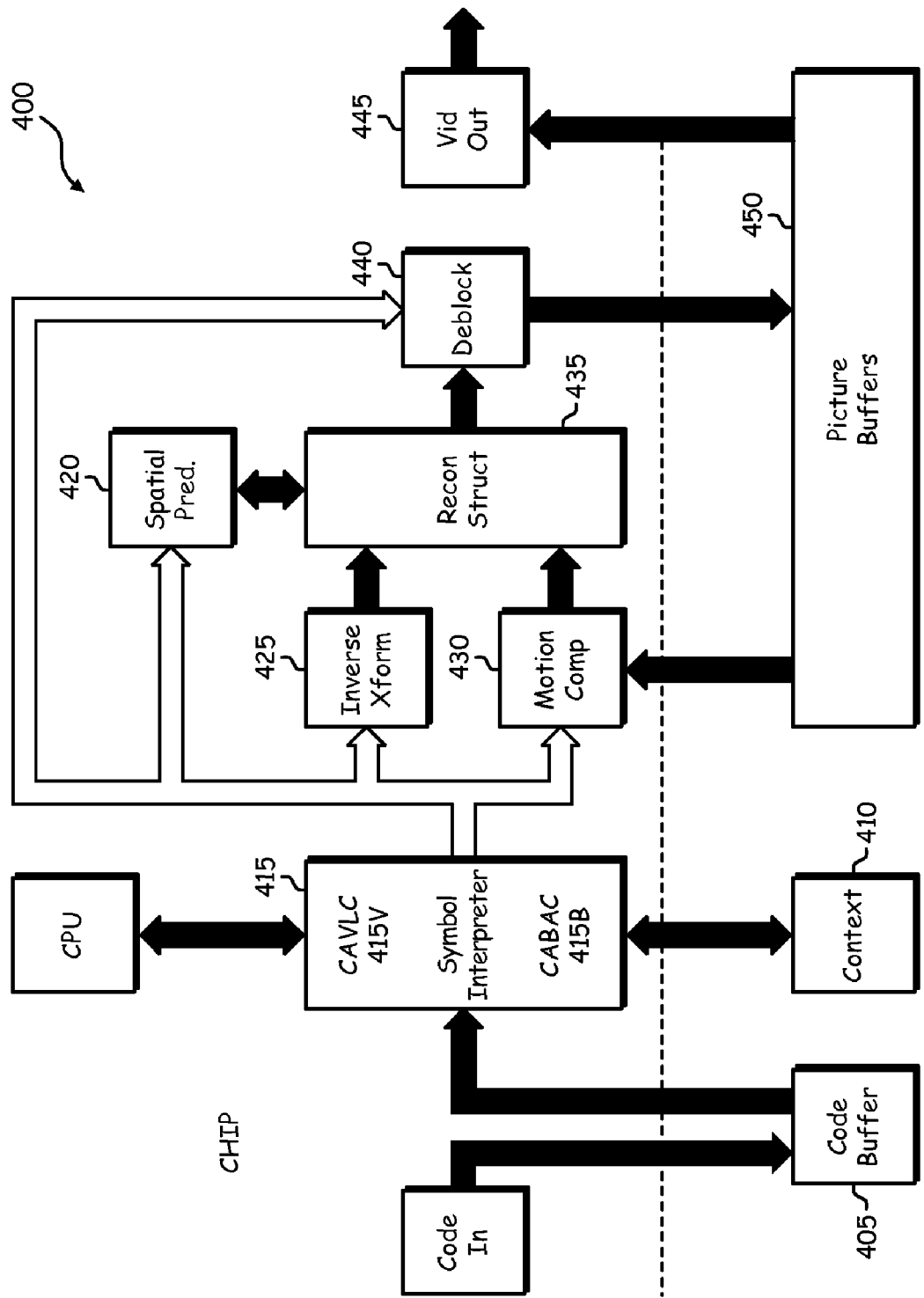
FIG. 4 is a block diagram of a video decoder in accordance with an embodiment of the present invention.

Referring now to FIG. 4, there is illustrated a block diagram describing an exemplary video decoder 400 in accordance with an embodiment of the present invention. The video decoder 400 includes a code buffer 405 for receiving a video elementary stream. The code buffer 405 can be a portion of a memory system, such as a dynamic random access memory (DRAM). A symbol interpreter 415 in conjunction with a context memory 410 decode the CABAC and CAVLC symbols from the bitstream. The context memory 410 can be another portion of the same memory system as the code buffer 405, or a portion of another memory system.

The symbol interpreter 415 includes a CAVLC decoder 415V and a CABAC decoder 415B. The CAVLC decoder 415V decodes CAVLC symbols, resulting in the sets 140 of quantized frequency coefficients $F_0$ . . . $F_n$. The CABAC decoder 415B decodes the CABAC symbols resulting in the side information.

The symbol interpreter 415 provides the sets of scanned quantized frequency coefficients $F_0$ . . . $F_n$ to an inverse scanner, quantizer, and transformer (ISQDCT) 425. Depending on the prediction mode for the macroblock 120 associated with the scanned quantized frequency coefficients $F_0 \ldots F_n$, the symbol interpreter 415 provides the side information to either a spatial predictor 420 (if spatial prediction) or a motion compensator 430 (if temporal prediction).

The ISQDCT 425 constructs the prediction error E. The spatial predictor 420 generates the prediction pixels P for spatially predicted macroblocks while the motion compensator 430 generates the prediction pixels P, or P0, P1 for temporally predicted macroblocks. The motion compensator 430 retrieves the prediction pixels P, or P0, P1 from picture buffers 450 that store previously decoded frames 100 or fields 110.

A pixel reconstructor 435 receives the prediction error E from the ISQDCT 425, and the prediction pixels from either the motion compensator 430 or spatial predictor 420. The pixel reconstructor 435 reconstructs the macroblock 120 from the foregoing information and provides the macroblock 120 to a deblocker 440. The deblocker 440 smoothes pixels at the edge of the macroblock 120 to prevent the appearance of blocking. The deblocker 440 writes the decoded macroblock 120 to the picture buffer 450. The picture buffer 450 can be a portion of DRAM.

A display engine 445 provides the frames 100 from the picture buffer 450 to a display device. The symbol interpreter 415, the ISQDCT 425, spatial predictor 420, motion compensatory 430, pixel reconstructor 435, and display engine 445 can be hardware accelerators under the control of a central processing unit (CPU).

Figure 5:
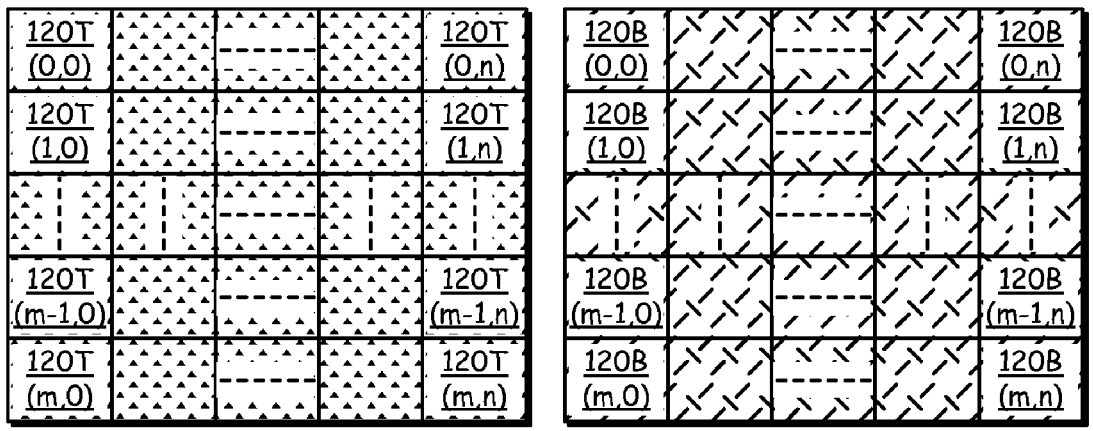
FIG. 5 is a block diagram describing the decoding order for a video decoder in accordance with an embodiment of the present invention.
Figure 5:
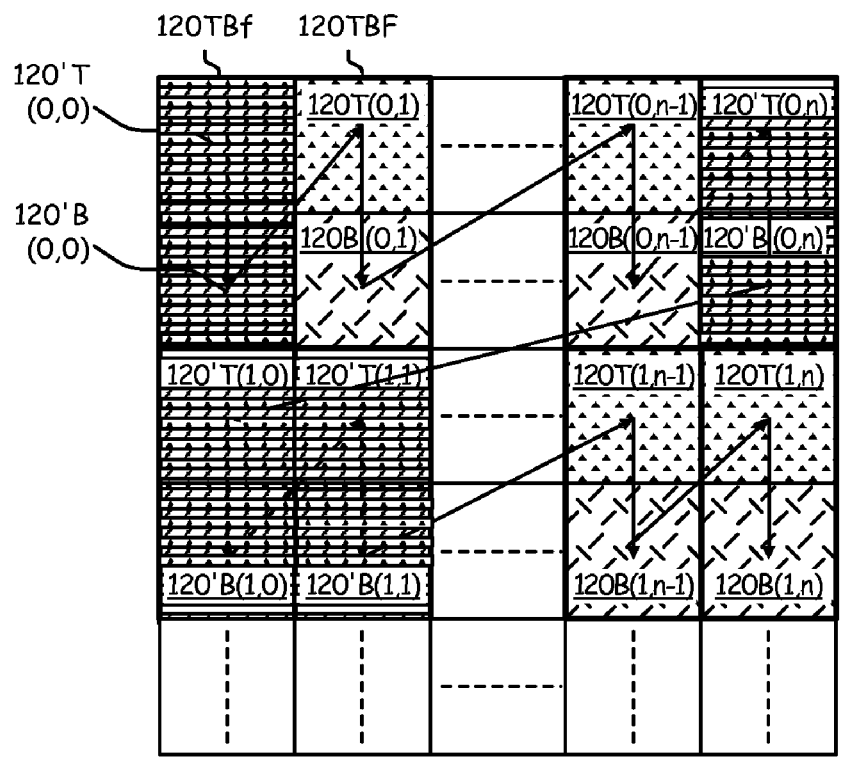

Referring now to FIG. 5, there is illustrated a block diagram describing the decoding order of the video decoder, in accordance with an embodiment of the present invention. For interlaced fields 110T, 110B with MBAFF encoding, the video decoder 400 decodes the macroblocks in pairs, starting with the macroblock pair 120T(0,0), 120B(0,0) at the top corners of the top field 110T and bottom field 110B and proceeding across the top row of macroblocks 120T(0,n), 120B(0,n). The video decoder 400 then proceeds to the left most macroblock of the next row of macroblocks 120T(1,0), 120B(1,0) and proceeds to the right, and so forth.

The macroblock pairs represent 32×16 pixel blocks of the frame 100. However, where the macroblock pairs are frame coded, such as macroblocks 120TBf, the reconstructed macroblocks 120'T(0,0), 120'B(0,0) represent the top and bottom halves of macroblocks 120T(0,0) and 120B(0,0) deinterlaced. Macroblock 120'T(0,0) includes the first eight lines of pixels from macroblocks 120T(0,0) and 120B(0,0). Macroblock 120'B(0,0) includes the last eight lines of pixels from macroblocks 120T(0,0) and 120B(0,0).

As can be seen, for any macroblock pair 120TB, the top, left, and top left corner neighboring pixels are previously decoded. Although the neighboring pixels can be fetched from the picture buffers 450, the spatial predictor 420 includes on-chip memory for storing the top, left, and top left corner neighboring pixels.

A row of macroblock pairs 120TB(0,y) includes at least some of the top neighboring pixels 125T and at least some of the top left corner neighboring pixels 125C for the next row of macroblock pairs 120TB(1,y). As the pixel reconstructor 435 generates the macroblock pairs 120TB across one row of macroblock pairs, e.g., 120TB(0,y), the spatial predictor 420 receives and stores the top neighboring pixels 125T and top left corner neighboring pixels 125C from macroblock pair row 120TB(0,y) for the next row of macroblock pairs 120TB(1,y).

Additionally, the left neighboring macroblock pair, e.g., macroblocks 120TB(1,0), includes the left neighboring pixels 125L and potentially some of the top left neighboring pixels 125C for macroblock pair 120TB(1,1). As the pixel reconstructor 435 generates the macroblock pair 120TB(1,0), the spatial predictor 420 stores the left neighboring pixels 125L and the top left corner neighboring pixels 125C from the macroblock pair 120TB(1,0) for macroblock pair 120TB(1,1).

However, the location of the top 125T, left 125L, and top left corner neighboring pixels 125C for a macroblock pair depends on the type of coding, field or frame, for the macroblock pair, its top neighboring macroblock pair, left neighboring macroblock pair, and top left corner neighboring macroblock pair.

Figure 6:
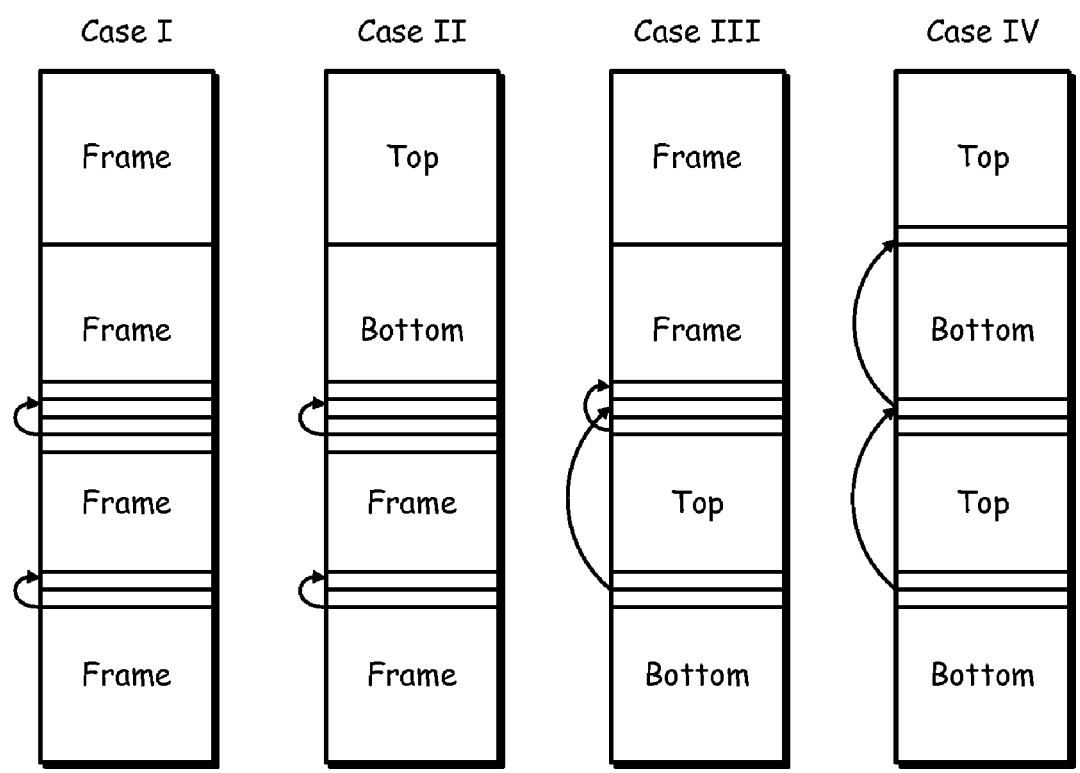
FIG. 6 is a block diagram describing top neighboring partitions.

Referring now to FIG. 6, there is illustrated a block diagram describing the top neighboring pixels for macroblock pairs. In case I, the macroblock pair and its top neighbor macroblock pair are both frame coded. The top neighboring pixels for each of the macroblocks are as indicated by the arrows.

In case II, the macroblock pair is frame coded while its top neighbor macroblock pair is field coded. The top neighboring pixels for each of the macroblocks are as indicated by the arrows.

In case III, the macroblock pair is field coded while its top neighbor macroblock pair is frame coded. The top neighboring pixels for each of the macroblocks are as indicated by the arrows.

In case IV, the macroblock pair and its top neighbor macroblock pair are both field coded. The top neighboring pixels for each of the macroblocks are as indicated by the arrows.

Figure 7:
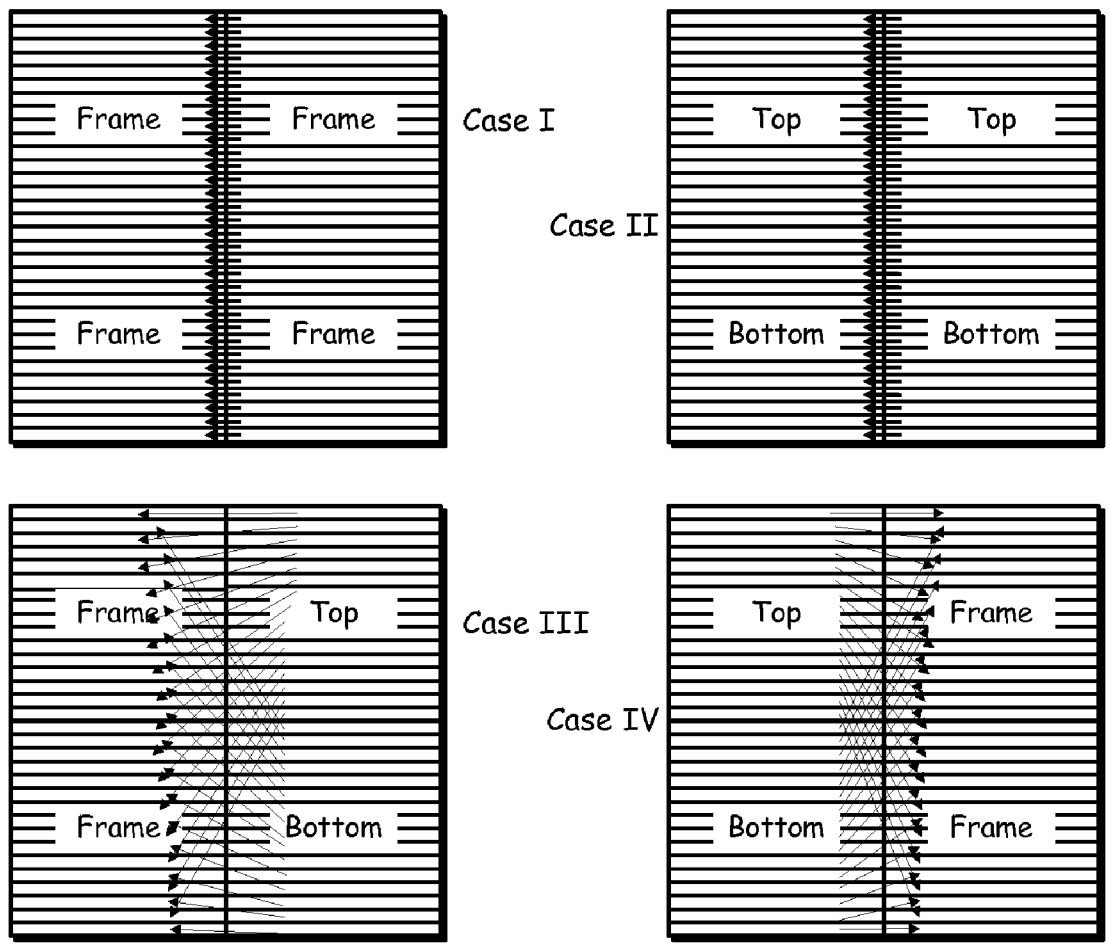
FIG. 7 is a block diagram describing left neighboring partitions.

Referring now to FIG. 7, there is illustrated a block diagram describing the left neighboring pixels for macroblock pairs. In case I, the macroblock pair and its left neighbor macroblock pair are both frame coded. The left neighboring pixels for each of the macroblocks are as indicated by the arrows.

In case II, the macroblock pair is frame coded while its left neighbor macroblock pair is field coded. The left neighboring pixels for each of the macroblocks are as indicated by the arrows.

In case III, the macroblock pair is frame coded while its left neighbor macroblock pair is field coded. The left neighboring pixels for each of the macroblocks are as indicated by the arrows.

In case IV, the macroblock pair and its left neighbor macroblock pair are both field coded. The left neighboring pixels for each of the macroblocks are as indicated by the arrows.

Figure 8:
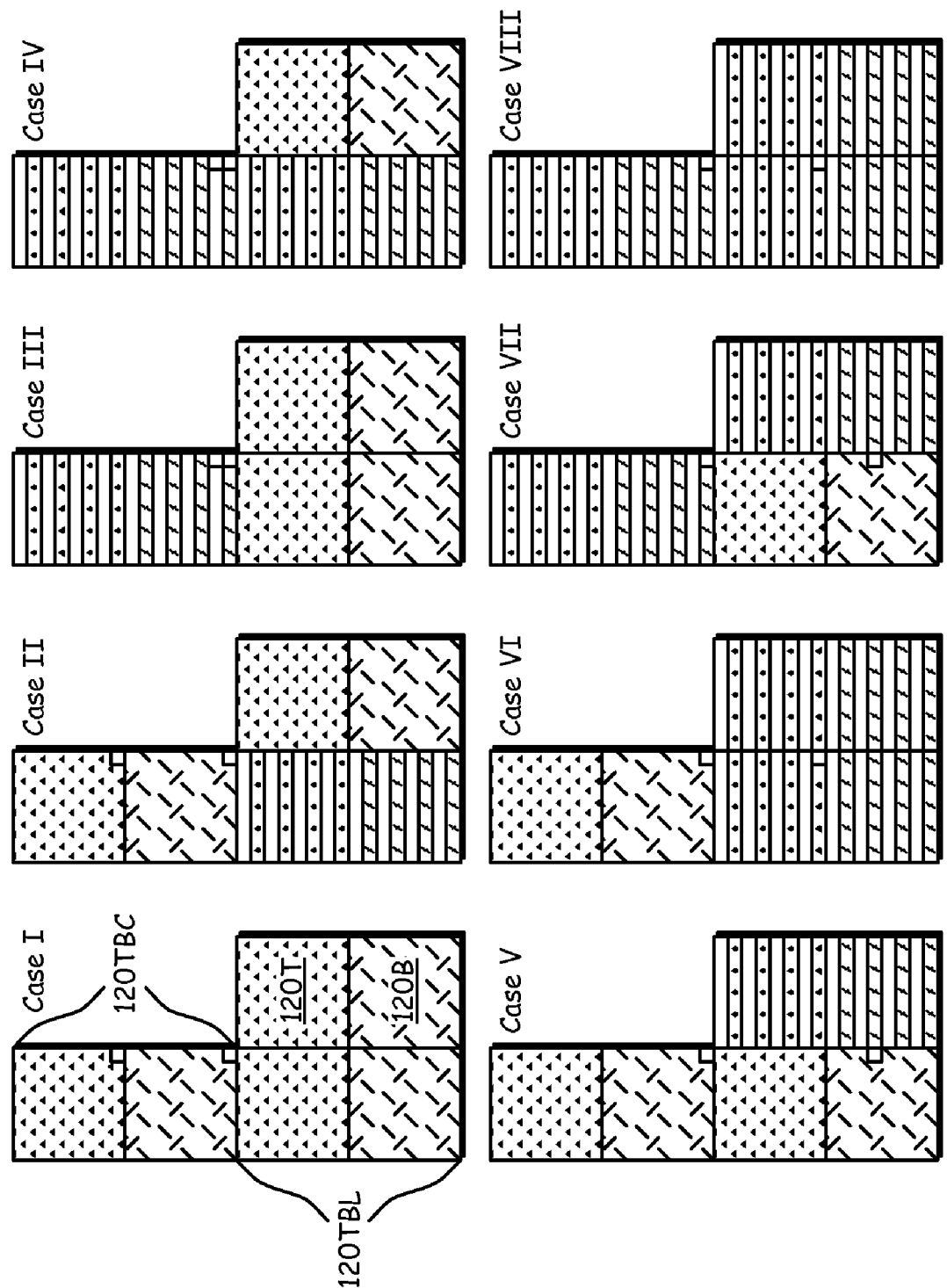
FIG. 8 is a block diagram describing top left neighboring pixels.

Referring now to FIG. 8, there is illustrated a block diagram describing the top left corner neighboring pixels for macroblock pairs.

In case I, macroblocks 120T, 120B are field coded, the left neighboring macroblock pair 120TBL is field coded, and the top left corner neighboring macroblock pair 120TBC is field coded. The top left corner neighboring pixels for the macroblocks 120T, 120B are as indicated by the white square.

In case II, macroblocks 120T, 120B are field coded, the left neighboring macroblock pair 120TBL is frame coded, and the top left corner neighboring macroblock pair 120TBC is field coded. The top left corner neighboring pixels for the macroblocks 120T, 120B are as indicated by the white square.

In case III, macroblocks 120T, 120B are field coded, the left neighboring macroblock pair 120TBL is field coded, and the top left corner neighboring macroblock pair 120TBC is frame coded. The top left corner neighboring pixels for the macroblocks 120T, 120B are as indicated by the white square.

In case IV, macroblocks 120T, 120B are field coded, the left neighboring macroblock pair 120TBL is frame coded, and the top left corner neighboring macroblock pair 120TBC is frame coded. The top left corner neighboring pixels for the macroblocks 120T, 120B are as indicated by the white square.

In case V, macroblocks 120T, 120B are frame coded, the left neighboring macroblock pair 120TBL is field coded, and the top left corner neighboring macroblock pair 120TBC is field coded. The top left corner neighboring pixels for the macroblocks 120T, 120B are as indicated by the white square.

In case VI, macroblocks 120T, 120B are frame coded, the left neighboring macroblock pair 120TBL is frame coded, and the top left corner neighboring macroblock pair 120TBC is field coded. The top left corner neighboring pixels for the macroblocks 120T, 120B are as indicated by the white square.

In case VII, macroblocks 120T, 120B are frame coded, the left neighboring macroblock pair 120TBL is field coded, and the top left corner neighboring macroblock pair 120TBC is frame coded. The top left corner neighboring pixels for the macroblocks 120T, 120B are as indicated by the white square.

In case VIII, macroblocks 120T, 120B are frame coded, the left neighboring macroblock pair 120TBL is frame coded, and the top left corner neighboring macroblock pair 120TBC is frame coded. The top left corner neighboring pixels for the macroblocks 120T, 120B are as indicated by the white square.

Figure 9:
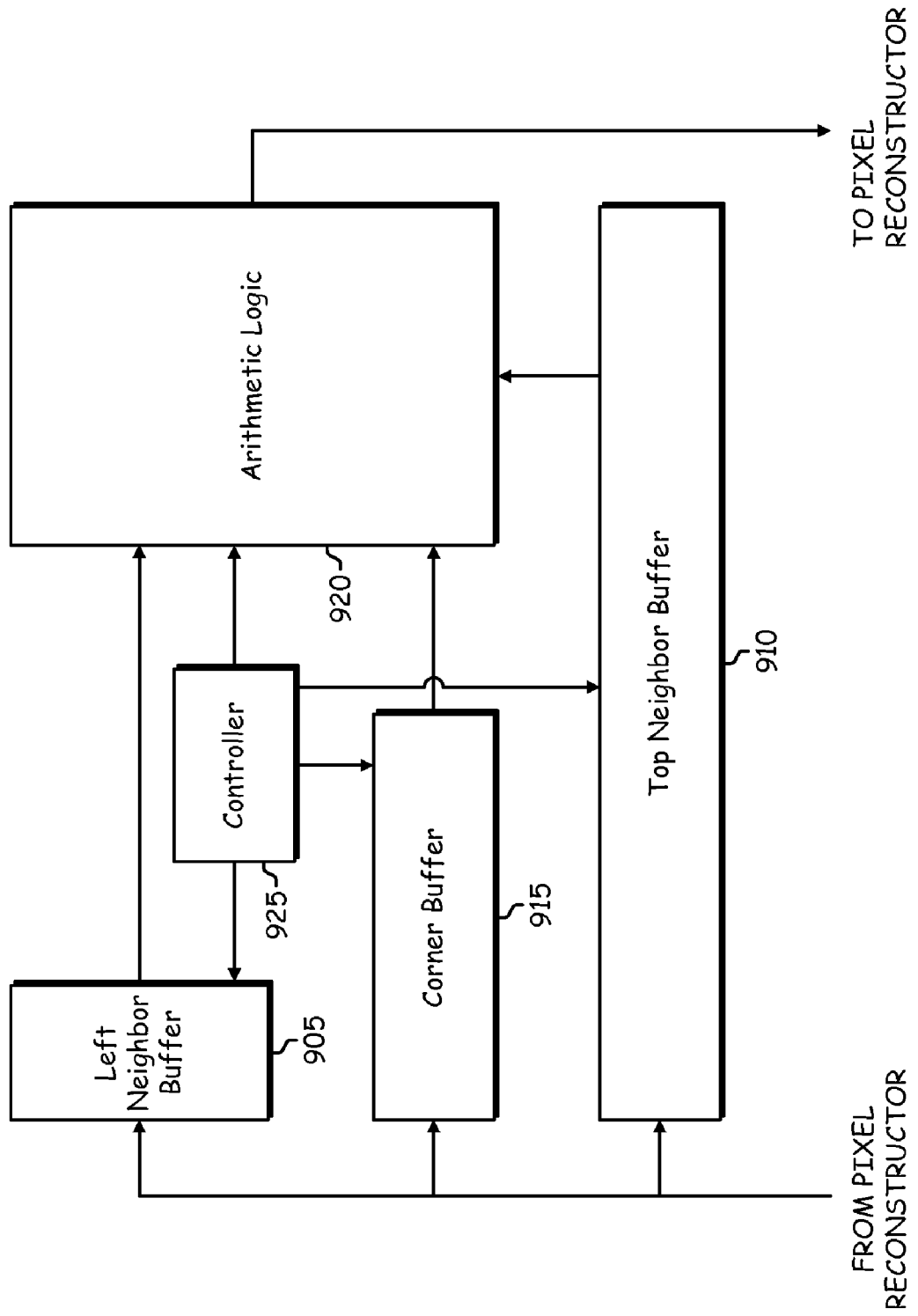
FIG. 9 is a block diagram describing a spatial predictor in accordance with an embodiment of the present invention.

Referring now to FIG. 9, there is illustrated a block diagram describing certain aspects of the spatial predictor 420 in accordance with an embodiment of the present invention. The spatial predictor 420 comprises a left neighbor buffer 905, a top neighbor buffer 910, a corner neighbor buffer 915, arithmetic logic 920, and a controller 925.

The left neighbor buffer 905 is a buffer that stores the right edge pixels, when a macroblock pair 120 is decoded. The top neighbor buffer 910 includes enough memory to store two entire pixel lines of a frame 100. The top neighbor buffer 910 stores two lines across each decoded macroblock pair 120TB. If the macroblock pair is frame coded, e.g., 120TBf, the top neighbor buffer 910 stores the last two lines of the bottom macroblock 120'B. If the macroblock pair is field coded, e.g., macroblock pair 120TBF, the top neighbor buffer 910 stores the bottom line of each macroblock 120T and 120B.

The corner buffer neighbor buffer 915 stores the top left corner neighboring pixels 125C. As can be seen in FIG. 8, in each macroblock pair 120TB, there are potentially three pixels that can be the top left neighboring pixel for a macroblock pair in the next row, or the next macroblock pair to the right. The corner neighbor buffer 915 stores each of these pixels.

When processing a macroblock pair 120TB, controller 925 determines the left neighboring pixels 125L from the left neighbor 905, the top neighboring pixels 125T from the top neighbor buffer 910, and the top left neighboring pixels 125C from the corner neighbor buffer 915, based on whether each macroblock pair 120TB is field or frame coded, as shown in FIGS. 6-8.

When the pixel reconstructor 435 decodes the macroblock pair 120TB, the left neighbor buffer 905 overwrites the pixels from the left neighboring macroblock pair 120TB with the right edge pixels of the macroblock pair 120TB. The top neighbor buffer 910 overwrites the pixels of the top neighboring macroblock pair 120TB with the bottom lines of macroblock pair 120TB (depending on the coding of the macroblock pair as described above). The corner buffer 915 overwrites the pixels from the top left corner neighboring macroblock pair 120TB with the potentially corner neighboring pixels from the macroblock pair 120TB.

The embodiments described herein may be implemented as a board level product, as a single chip, application specific integrated circuit (ASIC), or with varying levels of the decoder system integrated with other portions of the system as separate components. The degree of integration of the decoder system will primarily be determined by the speed and cost considerations. Because of the sophisticated nature of modern processor, it is possible to utilize a commercially available processor, which may be implemented external to an ASIC implementation. If the processor is available as an ASIC core or logic block, then the commercially available processor can be implemented as part of an ASIC device wherein certain functions can be implemented in firmware. Alternatively, the functions can be implemented as hardware accelerator units controlled by the processor.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A spatial predictor for decoding a portion of a picture, said spatial predictor comprising:
    a first buffer for storing pixels from a first portion of the picture being decoded, the first portion neighboring the portion;
    a second buffer for storing pixels from a second portion of the picture being decoded, the second portion neighboring the portion;
    a third buffer for storing one or more pixels from a third portion of the picture being decoded, the third portion neighboring the portion; and
    arithmetic logic for reconstructing the portion of the picture being decoded from at least one of the pixels from at least one of the first portion of the picture being decoded stored in the first buffer, the second portion of the picture being decoded stored in the second buffer, and the third portion of the picture being decoded stored in the third buffer.

2. The spatial predictor of claim 1, wherein the first portion is a left neighbor of the portion.

3. The spatial predictor of claim 1, wherein the second portion is a top neighbor of the portion.

4. The spatial predictor of claim 1, wherein the third portion is a top corner neighbor of the portion.

5. The spatial predictor of claim 4, wherein the third buffer overwrites the one or more pixels from the third portion with one or more pixels from the portion.

6. The spatial predictor of claim 1, wherein the portion, the first portion, the second portion, and the third portion each comprise macroblock pairs.

7. The spatial predictor of claim 6, wherein the second buffer stores pixels from each macroblock pair in a row comprising the second portion.

8. The spatial predictor of claim 7, wherein the second buffer overwrites the pixels from the second portion, with pixels from the first portion.

9. The spatial predictor of claim 6, wherein at least one of the first portion, second portion, and third portion are field coded, and further comprising:
    a controller for selecting the at least one of the pixels from the first buffer, the at least one of the pixels from the second buffer, and the at least one of the one or more pixels from the third buffer, based on the at least one of the first portion, second portion, and third portion that are field coded.

10. The spatial predictor of claim 9, wherein the third buffer stores one or more pixels from the first portion.

11. A method for processing a portion of a picture, said method comprising:
   storing pixels from a first portion of the picture being decoded, the first portion neighboring the portion in a first memory;
   storing pixels from a second portion of the picture being decoded, the second portion neighboring the portion in a second memory;
   storing one or more pixels from a third portion of the picture being decoded, the third portion neighboring the portion in a third memory; and
   decoding the portion of the picture being decoded from at least one of the pixels from at least one of the first portion of the picture being decoded stored in the first buffer, the second portion of the picture being decoded stored in the second buffer, and the third portion of the picture being decoded stored in the third buffer at arithmetic logic proximate to the first memory, second memory, and a third memory.

12. The method of claim 11, wherein the first portion is a left neighbor of the portion.

13. The method of claim 11, wherein the second portion is a top neighbor of the portion.

14. The method of claim 11, wherein the third portion is a top corner neighbor of the portion.

15. The method of claim 14, further comprising:
   overwriting the one or more pixels from the first portion with one or more pixels from the portion.

16. The method of claim 11, wherein the portion, the first portion, the second portion, and the third portion each comprise macroblock pairs.

17. The method of claim 6, wherein storing pixels from the second portion comprises:
   storing pixels from each macroblock pair in a row comprising the second portion.

18. The method of claim 16, wherein at least one of the first portion, second portion, and third portion are field coded, and further comprising:
   selecting particular ones of the pixels from the first memory, the second memory, and the third memory, based on the at least one of the first portion, second portion, and third portion that are field coded.

* * * * *